United States Patent
Gill

(10) Patent No.: US 7,265,951 B2
(45) Date of Patent: *Sep. 4, 2007

(54) HARD BIAS STRUCTURE WITH ENHANCED HC

(75) Inventor: Hardayal Singh Gill, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 11/325,391

(22) Filed: Jan. 3, 2006

(65) Prior Publication Data

US 2006/0114622 A1 Jun. 1, 2006

Related U.S. Application Data

(63) Continuation of application No. 10/614,071, filed on Jul. 2, 2003, now Pat. No. 7,016,164.

(51) Int. Cl.
  *G11B 5/39* (2006.01)
(52) U.S. Cl. ................................ 360/327.23
(58) Field of Classification Search ........... 360/324.11, 360/324.12, 327.1, 327.2, 327.23, 327.3, 360/327.31, 327.32
See application file for complete search history.

(56) References Cited

U.S. PATENT DOCUMENTS

| | | | |
|---|---|---|---|
| 6,266,218 B1 * | 7/2001 | Carey et al. | 360/324.12 |
| 7,016,164 B2 * | 3/2006 | Gill | 360/324.11 |
| 2002/0024781 A1 * | 2/2002 | Ooshima et al. | 360/324.12 |
| 2003/0133233 A1 * | 7/2003 | Gill | 360/324.12 |

* cited by examiner

*Primary Examiner*—Tianjie Chen
(74) *Attorney, Agent, or Firm*—Zilka-Kotab, PC

(57) ABSTRACT

A magnetic head having a sensor with a free layer, the free layer having a magnetic moment. Hard bias layers are positioned towards opposite track edges of the sensor, the bias layers stabilizing the magnetic moment of the free layer. An antiparallel (AP) pinned layer structure is positioned toward each of the hard bias layers, each AP pinned layer structure having at least two pinned layers with magnetic moments that are self-pinned antiparallel to each other. Each AP pinned layer structure stabilizes a magnetic moment of the hard bias layer closest to it. An antiferromagnetic layer is positioned toward each of the AP pinned layer structures, each antiferromagnetic layer stabilizing a magnetic moment of pinned layer closest to it.

21 Claims, 9 Drawing Sheets

HARD BIAS STRUCTURE WITH ENHANCED HC

RELATED APPLICATIONS

This application is a continuation of U.S. patent application Ser. No. 10/614,071 to Gill, filed Jul. 2, 2003 now U.S. Pat. No. 7,016,164.

FIELD OF THE INVENTION

The present invention relates to magnetic heads, and more particularly, this invention relates to read heads having hard bias layers with enhanced Hc.

BACKGROUND OF THE INVENTION

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

In high capacity disk drives, magnetoresistive (MR) read sensors, commonly referred to as MR heads, are the prevailing read sensors because of their capability to read data from a surface of a disk at greater track and linear densities than thin film inductive heads. An MR sensor detects a magnetic field through the change in the resistance of its MR sensing layer (also referred to as an "MR element") as a function of the strength and direction of the magnetic flux being sensed by the MR layer.

The conventional MR sensor operates on the basis of the anisotropic magnetoresistive (AMR) effect in which an MR element resistance varies as the square of the cosine of the angle between the magnetization in the MR element and the direction of sense current flow through the MR element. Recorded data can be read from a magnetic medium because the external magnetic field from the recorded magnetic medium (the signal field) causes a change in the direction of magnetization of the MR element, which in turn causes a change in resistance of the MR element and a corresponding change in the sensed current or voltage.

Another type of MR sensor is the giant magnetoresistance (GMR) sensor manifesting the GMR effect. In GMR sensors, the resistance of the GMR sensor varies as a function of the spin-dependent transmission of the conduction electrons between ferromagnetic layers separated by a non-magnetic layer (spacer) and the accompanying spin-dependent scattering which takes place at the interface of the ferromagnetic and non-magnetic layers and within the ferromagnetic layers.

GMR sensors using only two layers of ferromagnetic material (e.g., Ni—Fe) separated by a layer of non-magnetic material (e.g., copper) are generally referred to as spin valve (SV) sensors. In an SV sensor, one of the ferromagnetic layers, referred to as the pinned layer (reference layer), has its magnetization typically pinned by exchange coupling with an antiferromagnetic (e.g., NiO or Fe—Mn) layer. The pinning field generated by the antiferromagnetic layer should be greater than demagnetizing fields (about 200 Oe) at the operating temperature of the SV sensor (about 120° C.) to ensure that the magnetization direction of the pinned layer remains fixed during the application of external fields (e.g., fields from bits recorded on the disk). The magnetization of the other ferromagnetic layer, referred to as the free layer, however, is not fixed and is free to rotate in response to the field from the recorded magnetic medium (the signal field). U.S. Pat. No. 5,206,590 granted to Dieny et al., incorporated herein by reference, discloses a SV sensor operating on the basis of the GMR effect.

An exemplary high performance read head employs a spin valve sensor for sensing the magnetic signal fields from the rotating magnetic disk. FIG. 1A shows a prior art SV sensor 100 comprising a free layer (free ferromagnetic layer) 110 separated from a pinned layer (pinned ferromagnetic layer) 120 by a non-magnetic, electrically-conducting spacer layer 115. The magnetization of the pinned layer 120 is fixed by an antiferromagnetic (AFM) layer 130.

FIG. 1B shows another prior art SV sensor 150 with a flux keepered configuration. The SV sensor 150 is substantially identical to the SV sensor 100 shown in FIG. 1A except for the addition of a keeper layer 152 formed of ferromagnetic material separated from the free layer 110 by a non-magnetic spacer layer 154. The keeper layer 152 provides a flux closure path for the magnetic field from the pinned layer 120 resulting in reduced magnetostatic interaction of the pinned layer 120 with the free layer 110. U.S. Pat. No. 5,508,867 granted to Cain et al., incorporated herein by reference, discloses a SV sensor having a flux keepered configuration.

Another type of SV sensor is an antiparallel (AP)-pinned SV sensor. In AP-Pinned SV sensors, the pinned layer is a laminated structure of two ferromagnetic layers separated by a non-magnetic coupling layer such that the magnetizations of the two ferromagnetic layers are strongly coupled together antiferromagnetically in an antiparallel orientation. The AP-Pinned SV sensor provides improved exchange coupling of the antiferromagnetic (AFM) layer to the laminated pinned layer structure than is achieved with the pinned layer structure of the SV sensor of FIG. 1A. This improved exchange coupling increases the stability of the AP-Pinned SV sensor at high temperatures which allows the use of corrosion resistant antiferromagnetic materials such as NiO for the AFM layer.

Referring to FIG. 2A, an AP-Pinned SV sensor 200 comprises a free layer 210 separated from a laminated AP-pinned layer structure 220 by a nonmagnetic, electrically-conducting spacer layer 215. The magnetization of the laminated AP-pinned layer structure 220 is fixed by an AFM layer 230. The laminated AP-pinned layer structure 220 comprises a first ferromagnetic layer 226 and a second ferromagnetic layer 222 separated by an antiparallel coupling layer (APC) 224 of nonmagnetic material. The two ferromagnetic layers 226, 222 ($FM_1$ and $FM_2$) in the laminated AP-pinned layer structure 220 have their magnetization directions oriented antiparallel, as indicated by the arrows 227, 223 (arrows pointing out of and into the plane of the paper respectively).

A key requirement for optimal operation of an SV sensor is that the pinned layer should be magnetically saturated perpendicular to the air bearing surface. Lack of magnetic saturation in the pinned layer leads to reduced signal or dynamic range. Factors leading to a loss of saturation include demagnetizing fields at the edge of the pinned layer, magnetic fields from recorded data and from longitudinal biasing regions, current induced fields and the coupling field to the free layer.

Analysis of the magnetic state of pinned layers in small sensors (a few microns or less in width), reveals that due primarily to the presence of large demagnetizing fields at the sensor edges the magnetization is not uniform over the area of the pinned layer. FIG. 2B shows a perspective view of an SV sensor 250. The SV sensor 250 is formed of a sensor stripe 260 having a front edge 270 at the ABS and extending away from the ABS to a rear edge 272. Due to the large demagnetizing fields at the front edge 270 and the rear edge 272 of the sensor stripe 260, the desired perpendicular magnetization direction is achieved only at the center portion 280 of the pinned layer stripe, while the magnetization tends to be curled into a direction parallel to the ABS at the edges of the stripe. The extent of these curled regions is controlled by the magnetic stiffness of the pinned layer.

Furthermore, prior art AP-Pinned SV sensors use an AFM in order to pin the pinned layer magnetization. Most commonly used AFM materials have blocking temperatures (temperature at which the pinning field reaches zero Oe) near 200° C. This means that if the temperature of the SV sensor approaches this temperature, the pinned layer magnetization can change its orientation resulting in degraded SV sensor performance.

Although AP-Pinned SV sensors have large effective pinning fields because near cancellation of the magnetic moments of the two sub-layers results in a low net magnetic moment for the pinned layer, thermal stability is still a concern because the operating temperatures of these SV sensors in disk files can exceed 120° C. In addition, the AP-pinned layer structure is vulnerable to demagnetization during processing operations such as lapping.

Therefore there is a need for an SV sensor that increases the magnetic saturation of the pinned layer and reduces the sensitivity to demagnetizing fields particularly at the front and rear edges of the pinned layer stripe. In SV sensors that include AFM layers to provide exchange anisotropy fields to fix the pinned layer magnetization direction, there is a further need for an SV structure that reduces the temperature limitations imposed by the blocking temperature characteristics of the commonly used antiferromagnetic materials required in prior art SV sensors for providing pinning fields.

In any of the prior art sensors described above, the thickness of the spacer layer is chosen so that shunting of the sense current and a magnetic coupling between the free and pinned layer structures are minimized. This thickness is typically less than the mean free path of electrons conducted through the sensor. With this arrangement, a portion of the conduction electrons are scattered at the interfaces of the spacer layer with the pinned and free layer structures. When the magnetic moments of the pinned and free layer structures are parallel with respect to one another scattering is minimal and when their magnetic moments are antiparallel scattering is maximized. Changes in scattering changes the resistance of the spin valve sensor as a function of cos $\Theta$, where $\Theta$ is the angle between the magnetic moments of the pinned and free layer structures. The sensitivity of the sensor is quantified as magnetoresistive coefficient dr/R where dr is the change in the resistance of the sensor as the magnetic moment of the free layer structure rotates from a position parallel with respect to the magnetic moment of the pinned layer structure to an antiparallel position with respect thereto and R is the resistance of the sensor when the magnetic moments are parallel.

The transfer curve of a spin valve sensor is defined by the aforementioned cos $\Theta$ where $\Theta$ is the angle between the directions of the magnetic moments of the free and pinned layers. In a spin valve sensor subjected to positive and negative magnetic signal fields from a moving magnetic disk, which are typically chosen to be equal in magnitude, it is desirable that positive and negative changes in the resistance of the spin valve read head above and below a bias point on the transfer curve of the sensor be equal so that the positive and negative readback signals are equal. When the direction of the magnetic moment of the free layer is substantially parallel to the ABS and the direction of the magnetic moment of the pinned layer is perpendicular to the ABS in a quiescent state (no signal from the magnetic disk) the positive and negative readback signals should be equal when sensing positive and negative fields from the magnetic disk.

Accordingly, the bias point should be located midway between the top and bottom of the transfer curve. When the bias point is located below the midway point the spin valve sensor is negatively biased and has positive asymmetry and when the bias point is above the midway point the spin valve sensor is positively biased and has negative asymmetry. When the readback signals are asymmetrical, signal output and dynamic range of the sensor are reduced. Readback asymmetry is defined as:

$$\frac{V_1 - V_2}{\max(V_1 \text{ or } V_2)}$$

For example, +10% readback asymmetry means that the positive readback signal $V_1$ is 10% greater than it should be to obtain readback symmetry. 10% readback asymmetry is acceptable in some applications. +10% readback asymmetry may not be acceptable in applications where the applied field magnetizes the free layer close to saturation. The designer strives to improve asymmetry of the readback signals as much as practical with the goal being symmetry.

The location of the transfer curve relative to the bias point is influenced by four major forces on the free layer of a spin valve sensor, namely a ferromagnetic coupling field $H_{FC}$ between the pinned layer and the free layer, a net demagnetizing (demag) field $H_D$ from the pinned layer, a sense current field $H_I$ from all conductive layers of the spin valve except the free layer, a net image current field $H_{IM}$ from the first and second shield layers.

Another factor that can affect readback asymmetry is positive magnetostriction of the free layer structure. If the free layer structure has positive magnetostriction and is subjected to compressive stress, there will be a stress-induced anisotropy that urges the magnetic moment of the free layer from the aforementioned position parallel to the ABS toward a position perpendicular to the ABS. The result is readback asymmetry. The compressive stress occurs after the magnetic head is lapped at the ABS to form the stripe height of the sensor of the read head. After lapping, the free layer is in compression and this, in combination with positive magnetostriction, causes the aforementioned readback asymmetry. It is interesting to note that if the free layer structure has negative magnetostriction in combination with compressive stress that the magnetic moment of the free layer is strengthened along the position parallel to the ABS. A high negative magnetostriction, however, is not desirable because it makes the magnetic moment of the free layer structure stiff and less responsive to field signals from the rotating magnetic disk. Accordingly, it is desirable that the magnetostriction of the free layer be zero or only slightly negative.

Unfortunately, magnetostriction of the free layer is difficult to control in present sputtering deposition systems. A typical free layer structure includes first and second free layers wherein the first free layer is cobalt iron and the second free layer is nickel iron with the first free layer interfacing the copper spacer layer for increasing the magnetoresistive coefficient dr/R of the sensor. Typical compositions of the free layers are cobalt iron ($Co_{90}Fe_{10}$) for the first free layer and nickel iron ($Ni_{83}Fe_{17}$) for the second free layer. When these layers are formed by sputter deposition the free layer structure invariably has an undesirable positive magnetostriction. In the past, the positive magnetostriction of the free layers has been accomplished by changing the composition of the free layers, such as reducing the iron content in the nickel iron and/or reducing the iron content in the cobalt iron. Since there is typically more than one nickel iron and cobalt iron layer in the spin valve sensor, this means that the targets in the sensor have to be changed in order to change the composition and lower the magnetostriction of the free layer structure.

What is needed is a way to increase the Hc of the bias layer.

SUMMARY OF THE INVENTION

The present invention overcomes the drawbacks and limitations described above by providing a magnetic head having a sensor with a free layer, the free layer having a magnetic moment. Hard bias layers are positioned outside edges of the sensor, the bias layers stabilizing the magnetic moment of the free layer. Each of the hard bias layers has antiparallel (AP) pinned layer structure positioned nearby, each AP pinned layer structure having at least two pinned layers with magnetic moments that are self-pinned antiparallel to each other. Each AP pinned layer structure stabilizes a magnetic moment of the hard bias layer closest to it.

Preferably, each of the AP pinned layer structures has an antiferromagnetic layer positioned toward it, each antiferromagnetic layer stabilizing a magnetic moment of pinned layer closest thereto. Preferred materials for the hard bias layers are Co and Co alloys such as CoPt and CoPtCr. Preferred materials for the antiferromagnetic layers are PtMn and alloys thereof. In one embodiment, the pinned layers of the AP pinned layer structure each include at least Co and are separated by a layer of Ru. In this embodiment, the preferred material for the antiferromagnetic layers is PtMn. In another embodiment, the pinned layers of the AP pinned layer structure each include at least Fe and are separated by a layer of Cr. In this embodiment, the preferred material for the antiferromagnetic layers is PtMnCr. Preferred thicknesses of the antiferromagnetic layers is at least about 50 Å, ideally at least about 100 Å, measured in a direction perpendicular to a plane of the antiferromagnetic layer. Each of the pinned layers of the AP pinned layer structures is preferably less than about 25 Å, ideally less than about 15 Å, thick.

In a preferred embodiment, the AP pinned layer structures are positioned between the hard bias layers and the antiferromagnetic layers. Also preferably, a magnetic moment of each pinned layer closest to the associated hard bias layers is oriented parallel to a magnetic moment of the associated hard bias layer.

The structure described above preferably provides an Hc of each of the bias layers of at least two times, and at least three times, an Hc of hard bias layers in a structure identical in every way but without antiferromagnetic layers.

The reading head described herein may form part of a GMR head, a CIP GMR head, a CPP GMR head, a tunnel valve head, etc. for use in a magnetic storage system.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 1A:
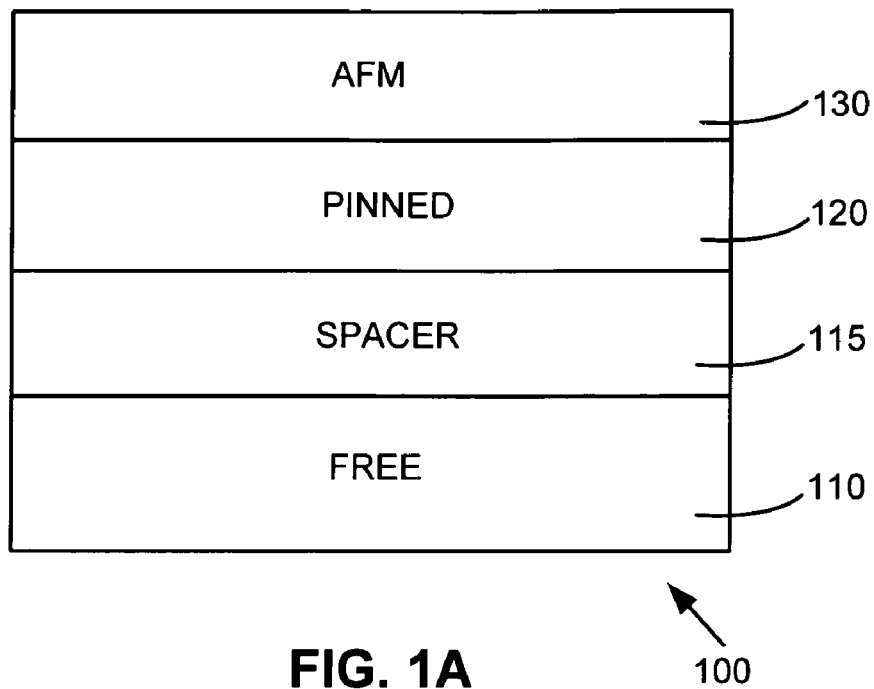
FIG. 1A is an air bearing surface view, not to scale, of a prior art spin valve (SV) sensor.
Figure 1B:
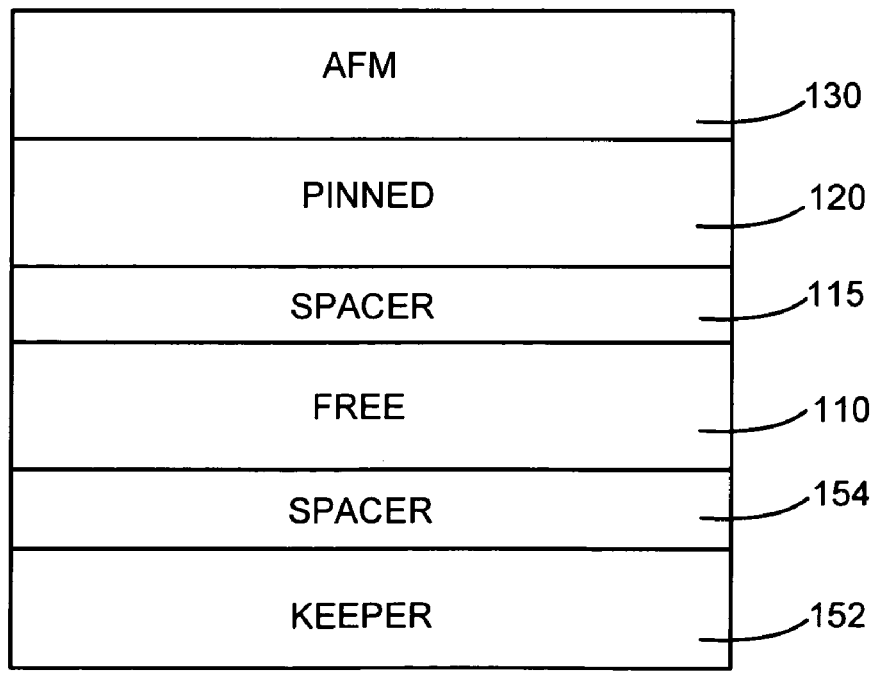
FIG. 1B is an air bearing surface view, not to scale, of a prior art keepered SV sensor.
Figure 2A:
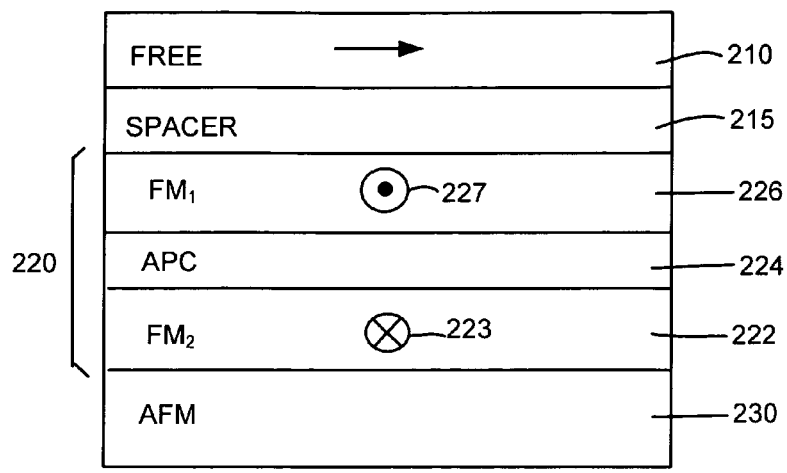
FIG. 2A is an air bearing surface view, not to scale, of a prior art AP-Pinned SV sensor.
Figure 2B:
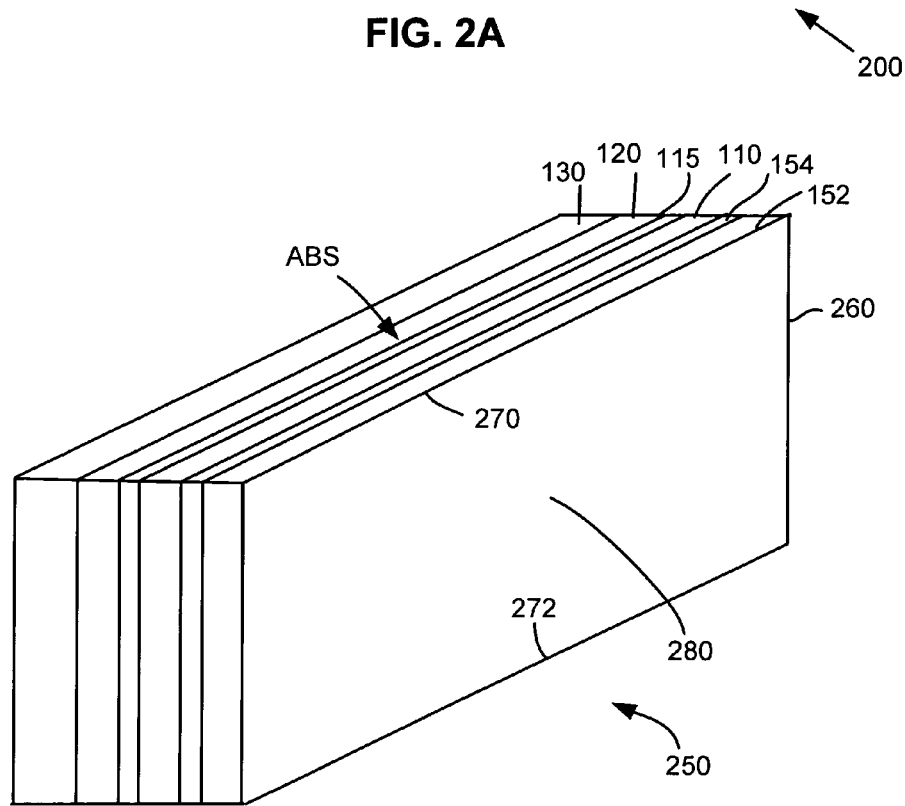
FIG. 2B is a perspective view, not to scale, of a prior art AP-Pinned SV sensor.
Figure 3:
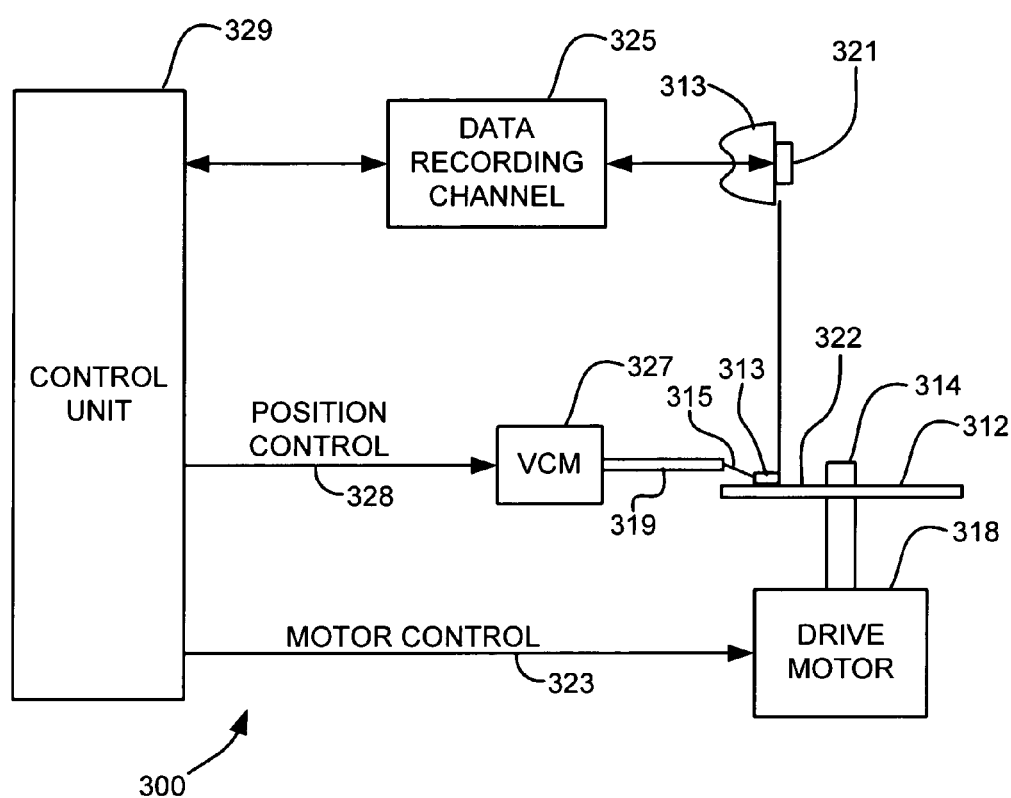
FIG. 3 is a simplified drawing of a magnetic recording disk drive system.

Referring now to FIG. 3, there is shown a disk drive 300 embodying the present invention. As shown in FIG. 3, at least one rotatable magnetic disk 312 is supported on a spindle 314 and rotated by a disk drive motor 318. The magnetic recording on each disk is in the form of an annular pattern of concentric data tracks (not shown) on the disk 312.

At least one slider 313 is positioned near the disk 312, each slider 313 supporting one or more magnetic read/write heads 321. More information regarding such heads 321 will be set forth hereinafter during reference to FIG. 4. As the disks rotate, slider 313 is moved radially in and out over disk surface 322 so that heads 321 may access different tracks of the disk where desired data are recorded. Each slider 313 is attached to an actuator arm 319 by means way of a suspension 315. The suspension 315 provides a slight spring force which biases slider 313 against the disk surface 322. Each actuator arm 319 is attached to an actuator means 327. The actuator means 327 as shown in FIG. 3 may be a voice coil motor (VCM). The VCM comprises a coil movable within a fixed magnetic field, the direction and speed of the coil movements being controlled by the motor current signals supplied by controller 329.

During operation of the disk storage system, the rotation of disk 312 generates an air bearing between slider 313 and disk surface 322 which exerts an upward force or lift on the slider. The air bearing thus counter-balances the slight spring force of suspension 315 and supports slider 313 off and slightly above the disk surface by a small, substantially constant spacing during normal operation.

The various components of the disk storage system are controlled in operation by control signals generated by control unit 329, such as access control signals and internal clock signals. Typically, control unit 329 comprises logic control circuits, storage means and a microprocessor. The control unit 329 generates control signals to control various system operations such as drive motor control signals on line 323 and head position and seek control signals on line 328. The control signals on line 328 provide the desired current profiles to optimally move and position slider 313 to the desired data track on disk 312. Read and write signals are communicated to and from read/write heads 321 by way of recording channel 325.

The above description of a typical magnetic disk storage system, and the accompanying illustration of FIG. 3 are for representation purposes only. It should be apparent that disk storage systems may contain a large number of disks and actuators, and each actuator may support a number of sliders.

Figure 4:
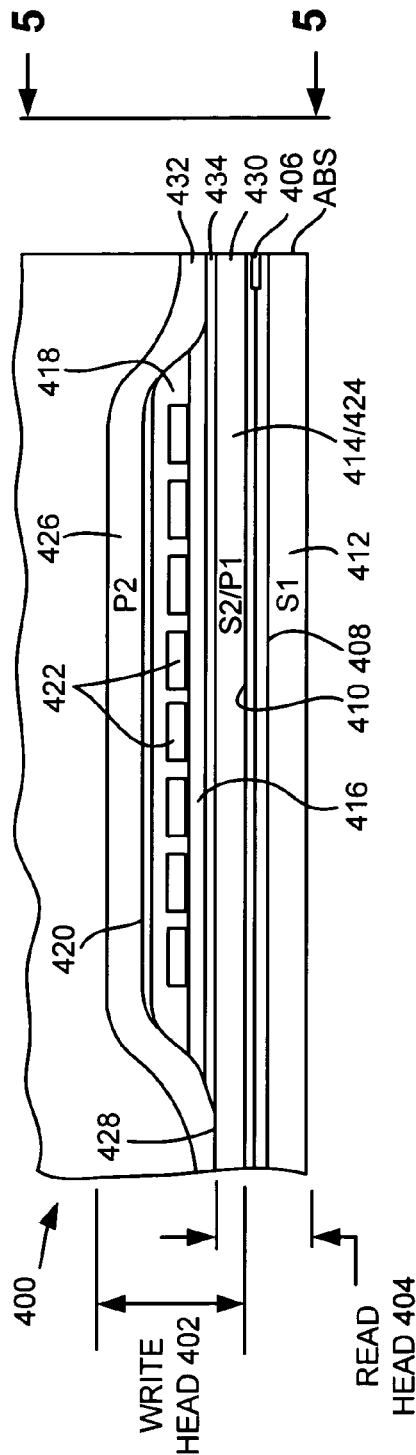
FIG. 4 is a partial view of the slider and a merged magnetic head.
Figure 5:
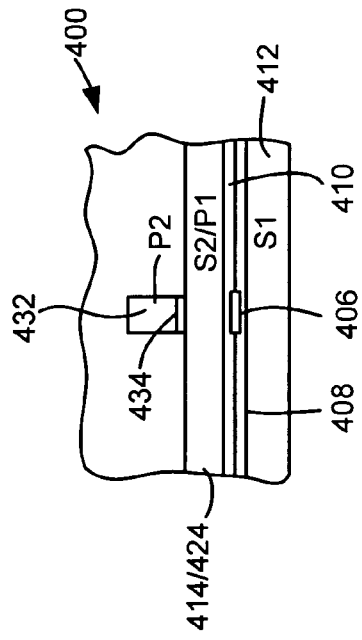
FIG. 5 is a partial ABS view, not to scale, of the slider taken along plane 5-5 of FIG. 4 to show the read and write elements of the merged magnetic head.

FIG. 4 is a side cross-sectional elevation view of a merged magnetic head 400, which includes a write head portion 402 and a read head portion 404, the read head portion employing a dual spin valve sensor 406 of the present invention. FIG. 5 is an ABS view of FIG. 4. The spin valve sensor 406 is sandwiched between nonmagnetic electrically insulative first and second read gap layers 408 and 410, and the read gap layers are sandwiched between ferromagnetic first and second shield layers 412 and 414. In response to external magnetic fields, the resistance of the spin valve sensor 406 changes. A sense current ($I_s$) conducted through the sensor causes these resistance changes to be manifested as potential changes. These potential changes are then processed as readback signals by the processing circuitry 329 shown in FIG. 3.

The write head portion 402 of the magnetic head 400 includes a coil layer 422 sandwiched between first and second insulation layers 416 and 418. A third insulation layer 420 may be employed for planarizing the head to eliminate ripples in the second insulation layer caused by the coil layer 422. The first, second and third insulation layers are referred to in the art as an "insulation stack". The coil layer 422 and the first, second and third insulation layers 416, 418 and 420 are sandwiched between first and second pole piece layers 424 and 426. The first and second pole piece layers 424 and 426 are magnetically coupled at a back gap 428 and have first and second pole tips 430 and 432 which are separated by a write gap layer 434 at the ABS. Since the second shield layer 414 and the first pole piece layer 424 are a common layer this head is known as a merged head. In a piggyback head an insulation layer is located between a second shield layer and a first pole piece layer. First and second solder connections (not shown) connect leads (not shown) from the spin valve sensor 406 to leads (not shown) on the slider 313 (FIG. 3), and third and fourth solder connections (not shown) connect leads (not shown) from the coil 422 to leads (not shown) on the suspension.

Figure 6:
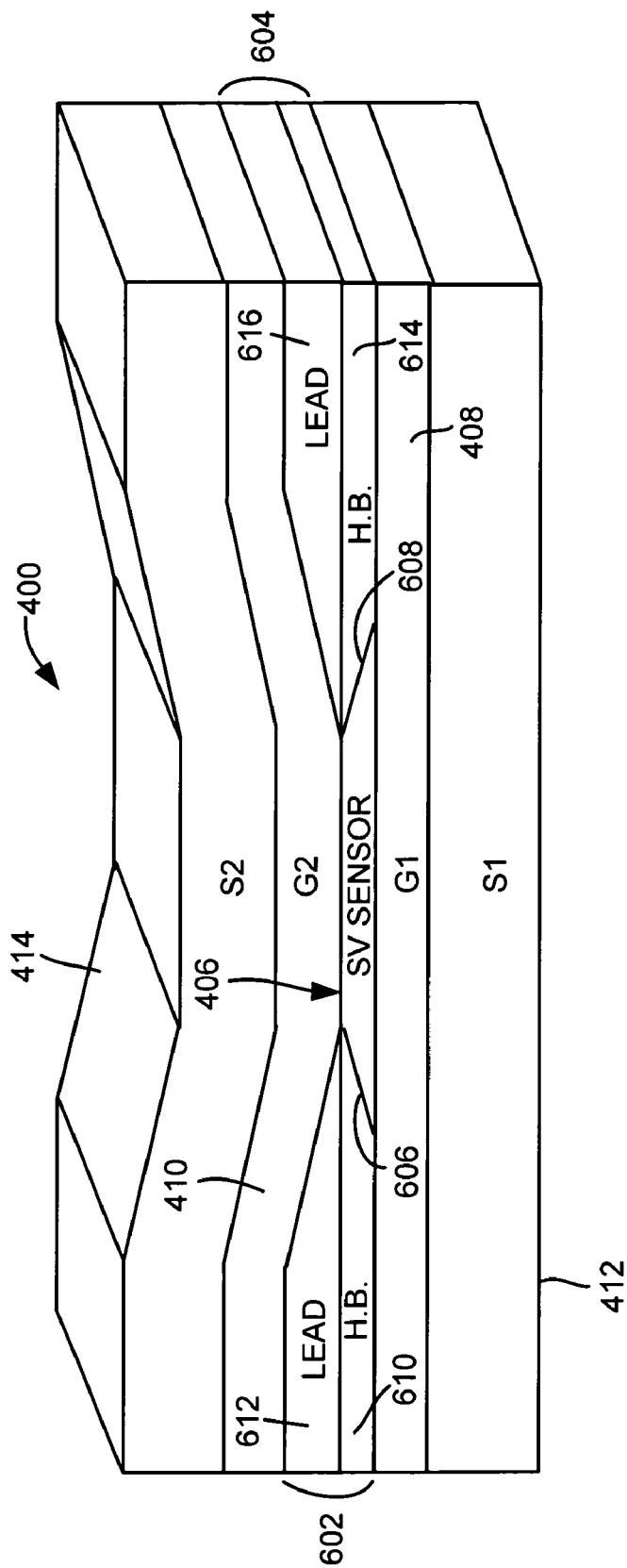
FIG. 6 is an enlarged isometric illustration, not to scale, of the read head with a spin valve sensor.

FIG. 6 is an enlarged isometric ABS illustration of the read head 400 shown in FIG. 4. The read head 400 includes the spin valve sensor 406. First and second hard bias and lead layers 602 and 604 are connected to first and second side edges 606 and 608 of the spin valve sensor. This connection is known in the art as a contiguous junction and is fully described in U.S. Pat. No. 5,018,037 which is incorporated by reference herein. The first hard bias and lead layers 602 include a first hard bias layer 610 and a first lead layer 612 and the second hard bias and lead layers 604 include a second hard bias layer 614 and a second lead layer 616. The hard bias layers 610 and 614 cause magnetic fields to extend longitudinally through the spin valve sensor 406 for stabilizing the magnetic domains therein. The spin valve sensor 406 and the first and second hard bias and lead layers 602 and 604 are located between the nonmagnetic electrically insulative first and second read gap layers 408 and 410. The first and second read gap layers 408 and 410 are, in turn, located between the ferromagnetic first and second shield layers 412 and 414.

The present invention provides a new sensor structure with an improved peripheral structure that achieves a higher hard bias Hc than current state of the art heads. In the embodiments described below, the Hc of the hard bias layer is at least 2 to 3 times greater than current heads. This in turn reduces the dependence of the hard bias layers on seed layers. Further, the hard bias layers are more stable, and can be made thinner. Many types of heads can use the structure described herein, and the structure is particularly adapted to a CIP GMR sensor.

In the following description, the width of the layers (W) refers to the track width. The sensor height is in a direction into the face of the paper. Unless otherwise described, thicknesses of the individual layers are taken perpendicular to the plane of the associated layer and are provided by way of example only and may be larger and/or smaller than those listed. Similarly, the materials listed herein are provided by way of example only, one skilled in the art will understand that other materials may be used without straying from the spirit and scope of the present invention.

CIP GMR

Figure 7:
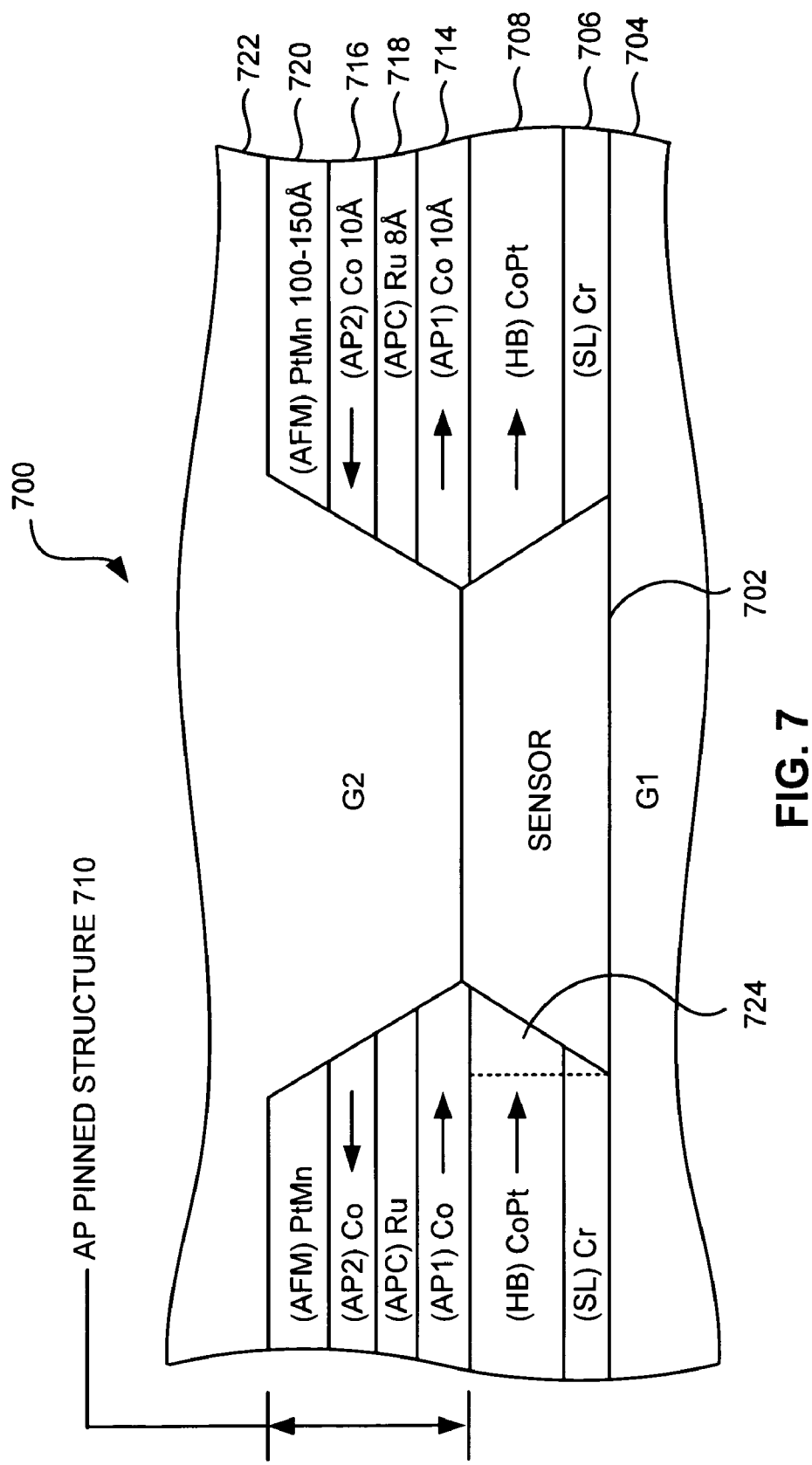
FIG. 7 is an ABS illustration of a CIP GMR sensor structure, not to scale, according to an embodiment of the present invention.

FIG. 7 depicts an ABS view of a CIP GMR sensor structure 700 according to one embodiment. "CIP" means that the sensing current ($I_s$) flows from in a direction parallel to or "in" the plane of the layers forming the sensor 700. As shown, a sensor (SENSOR) 702 is formed on a lower insulative layer (G1) 704, which can be constructed of $Al_2O_3$. An illustrative sensor 702 is described below. A seed layer (SL) 706 is formed on either side of the sensor 702, i.e., along the track edges of the sensor. A preferred material for the seed layer is Cr. A hard bias layer (HB) 708 is formed above each seed layer 706. The hard bias layer orients and stabilizes the magnetic moment of the free layer of the sensor 702. Preferred materials for the hard bias layer 708 include CoPt, CoPtCr, etc.

An AP exchange pinned structure 710 is formed above each hard bias layer 708. The AP pinned structure 710 includes upper and lower second AP pinned magnetic layers, (AP1) and (AP2) 714, 716, are separated by a thin layer of an antiparallel coupling (APC) material 718 such that the magnetic moments of the AP pinned layers 714, 716 are self-pinned antiparallel to each other. More particularly, the magnetic coupling of the pinned layers 714, 716 through the AP coupling layer 718 causes the pinned layers 714, 716 to have antiparallel-oriented magnetizations. The pinned layers 714, 716 have a thickness preferably less than about 25 Å, and ideally between about 5 and 15 Å. A preferred thickness of the AP coupling layer 718 is between about 5 and 10 Å, ideally about 8 Å.

An antiferromagnetic layer 720 is formed above each AP pinned structure 710.

Preferred materials for the antiferromagnetic layer 720 are PtMn, CrPtMn, etc. A preferred thickness for the antiferrromagnetic layer 720 is greater than about 50 Å, and ideally about 100-150 Å. A cap (not shown) can be formed about the antiferrromagnetic layers 720. A second insulative layer (G2) 722 is formed above the structure heretofore described.

To effectively orient and stabilize the free layer of the sensor 702 and thus improve stability of the resulting read signal, the hard bias layer 708 must have a high coercivity, and be permanently magnetized in one direction. Coercivity is the external field that moves the magnetization of the hard bias layer 708. In current state of the art heads, the coercivity of the hard bias layer 708 is dependent upon the seed layer 706, i.e., the hard bias layer 708 needs some type of seed layer 706 below it to develop the coercivity. However, because the thicknesses of the layers forming the seed layer 706 are difficult to control, the coercivity of the hard bias layer 708 may be unstable. Further, the coercivity of the hard bias layer 708 begins to degrade as the hard bias layer 708 begins to overlap the edge of the sensor 702. This overlap section 724 is shown in FIG. 7.

Figure 8:
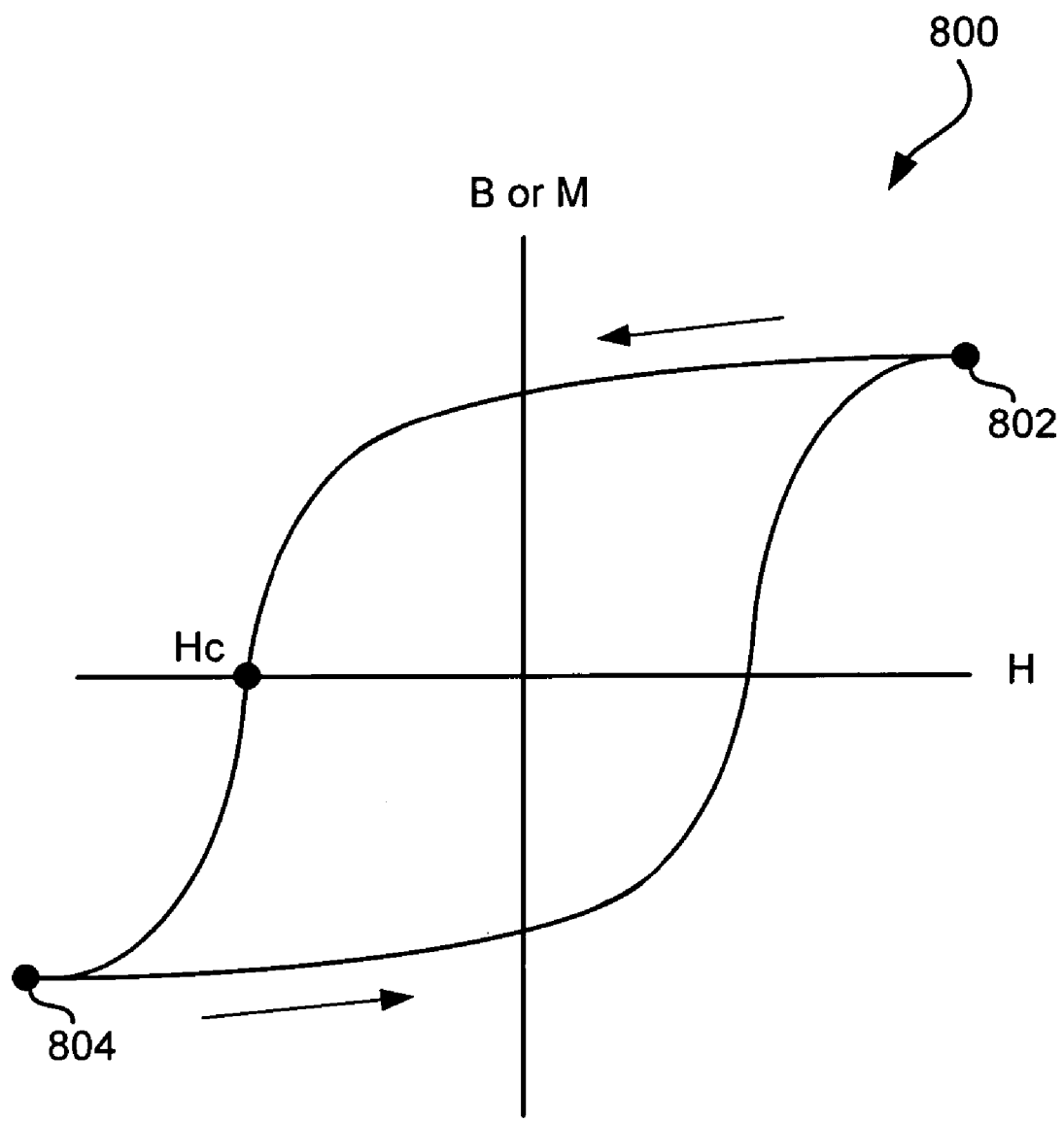
FIG. 8 is an ABS illustration of a CIP GMR sensor structure, not to scale, according to another embodiment of the present invention.

The coercivity of the hard bias layer 708 follows Hysteresis loop 800, shown in FIG. 8. When a large field (H) is applied to a magnetic layer such as the hard bias layer 708, the magnetization of the magnetic layer rises to a certain level (B or M) 802, and tends to remain at about that maximum value until an opposite magnetic field pushes the magnetization of the magnetic layer down to zero (He). As the field becomes more negative, the magnetization of the magnetic layer moves towards a minimum value 804.

At the minimum value, the magnetization of the magnetic layer tends to stay at about the minimum value until a large positive field pushes the magnetic layer back to the maximum value.

It is desirable to make the hard bias layer 708 stable such that the hard bias layer 708 does not change H values. The present invention make the Hc of the hard bias layer 708 larger so that large external fields do not cause the magnetization of the hard bias layer 708 to flip.

As mentioned above, because the hard bias layer 708 overlays a portion of the sensor 702, the coercivity of the hard bias layer 708 sitting on the sensor 702 is different. By adding the AP pinned structure 710 on top of the hard bias layer 708, the Hc of the hard bias layer 708 can be improved. The mechanism used is antiparallel coupling.

One type of coupling is created by a cobalt-type system positioned above the hard bias layer 708. In this embodiment, shown in FIG. 7, the pinned layers 714, 716 of the AP pinned structure 710 are constructed from Co separated by a thin Ru antiparallel coupling layer 718. The antiferromagnetic layer 720, preferably of PtMn, pins the upper pinned layer 716 of the AP pinned structure 710 substantially permanently. Because it is pinned, the magnetization of the upper pinned layer 716 becomes more resistant to reorientation, i.e., the layer has a higher coercivity by a factor of 2, 3, or more. The upper pinned layer 716 creates an antiparallel coupling with the lower pinned layer 714 and a CoPt hard bias layer 708 in the presence of an Ru spacer 718 such that the magnetizations of the lower pinned layer 714 and the CoPt hard bias layer 708 are antiparallel to the magnetization of the upper pinned layer 716. Thus, both the lower pinned layer 714 and the CoPt hard bias layer 708 are oriented in the same direction.

Figure 9:
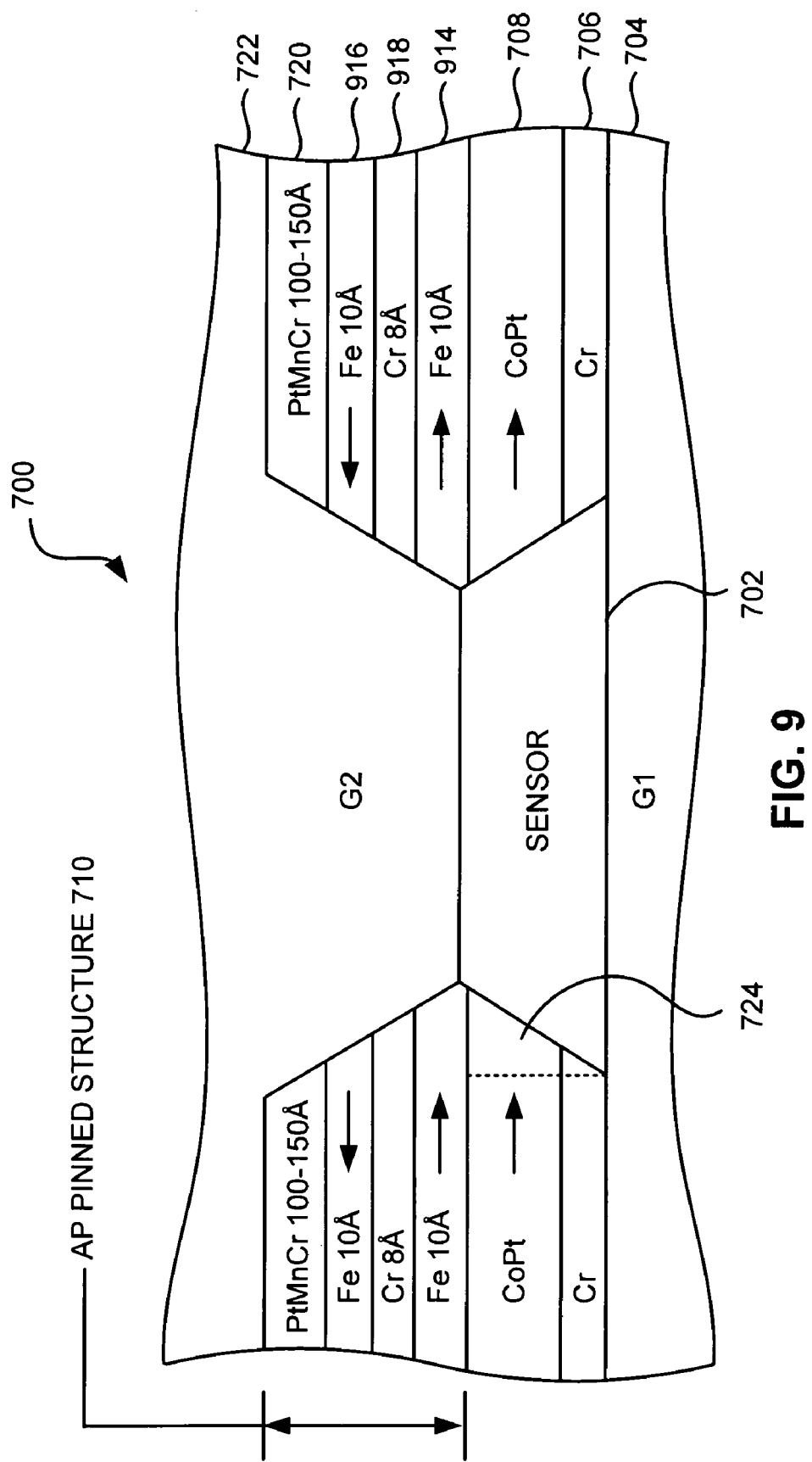
FIG. 9 is an ABS illustration of a sensor, not to scale, according to an embodiment of the present invention.

Another type of coupling is created by an iron-type system positioned above the hard bias layer 708. Referring to FIG. 9, the pinned layers 914, 916 of the AP pinned structure 710 are constructed from Fe separated by a thin Cr antiparallel coupling layer 918. This type of coupling functions in a similar manner as the coupling described in the preceding paragraphs. Note that the preferred material for the antiferromagnetic layer 720 in this configuration is CrPtMn.

The resulting pinning of the hard bias layer 708 reduces the dependence on seed layers, and thus the hard bias layer 708 will have a high coercivity not dependent on the seed layer. Further, the hard bias layer 708 is more stable, and can then be made thinner.

Figure 10:
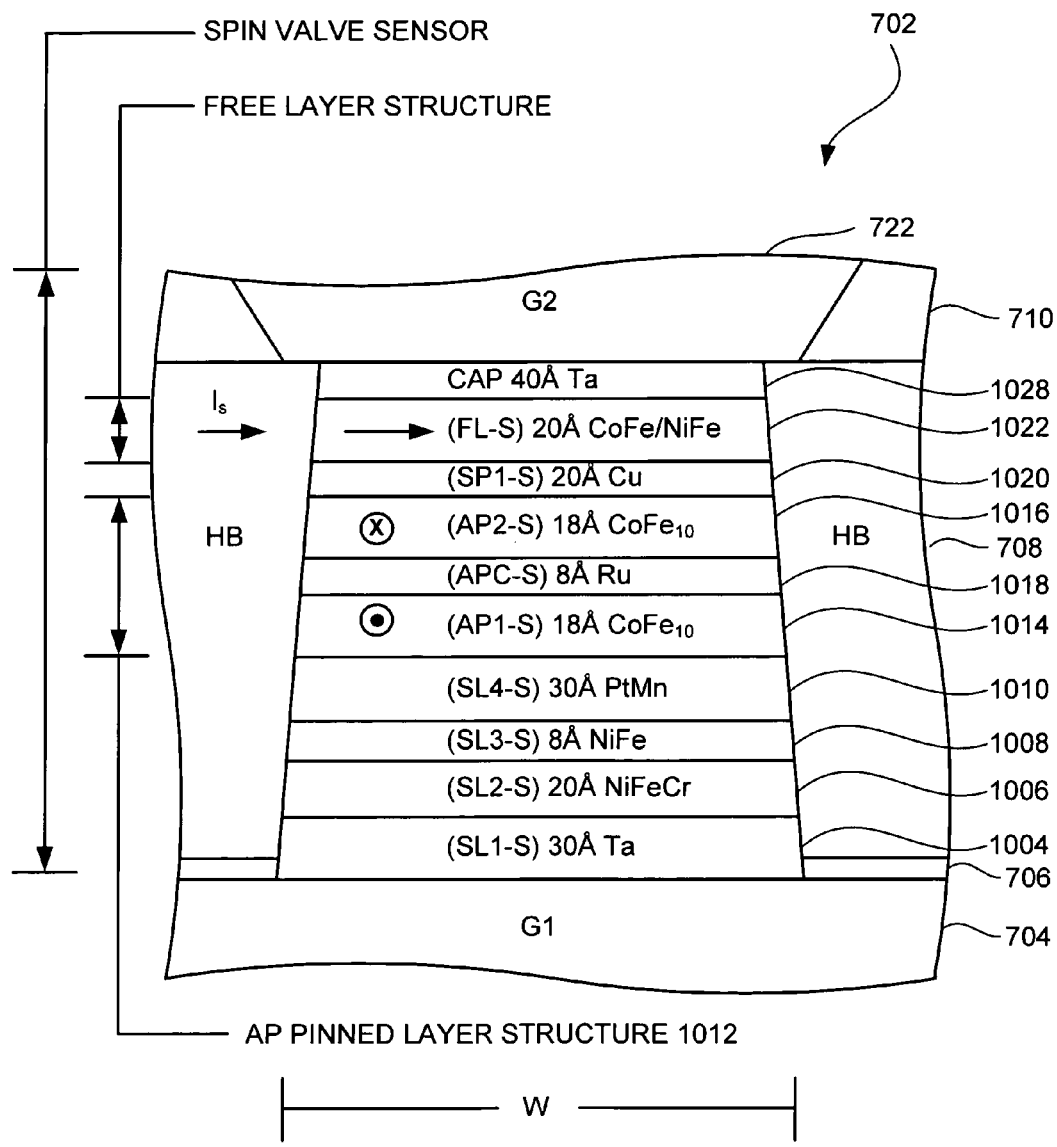
FIG. 10 is an ABS illustration of a sensor that can be used with the embodiments described herein.

FIG. 10 illustrates an ABS view of a sensor 702 that can be used with the embodiments described herein. Note that other sensor configurations can also be used.

Seed layers are formed on the first layer of insulative material 704. The seed layers aid in creating the proper growth structure of the layers above them. Illustrative materials formed in a stack from the first shield layer 1002 are a layer of Ta (SL1-S) 1004, a layer of NiFeCr (SL2-S) 1006, a layer of NiFe (SL3-S) 1008 and a layer of PtMn (SL4-S) 1010. Illustrative thicknesses of these materials are Ta (30 Å), NiFeCr (20 Å), NiFe (8 Å), and PtMn (30 Å). Note that the stack of seed layers can be varied, and layers may be added or omitted based on the desired processing parameters.

Then an antiparallel (SAP) pinned layer structure 1012 is formed above the seed layers. As shown in FIG. 10, first and second AP pinned magnetic layers, (AP1-S) and (AP2-S) 1014, 1016, are separated by a thin layer of an antiparallel coupling (APC-S) material 1018 such that the magnetic moments of the AP pinned layers 1014, 1016 are self-pinned antiparallel to each other. The pinned layers 1014, 1016 have a property known as magnetostriction. The magnetostriction of the pinned layers 1014, 1016 is very positive. The sensor 702 is also under compressive stresses because of its geometry at the ABS, and the configuration of the layer is such that it produces very large compressive stress. The combination of positive magnetostriction and compressive stress causes the pinned layers 1014, 1016 to develop a magnetic anisotropy that is in a perpendicular direction to the track width. This magnetic coupling through the Ru spacer causes the pinned layers 1014, 1016 to have antiparallel-oriented magnetizations.

In the embodiment shown in FIG. 10, the preferred magnetic orientation of the pinned layers 1014, 1016 is for the first pinned layer 1014, into the face of the structure depicted (perpendicular to the ABS of the sensor 702), and out of the face for the second pinned layer 1016. Illustrative materials for the pinned layers 1014, 1016 are $CoFe_{10}$ (100% Co, 10% Fe), $CoFe_{50}$ (50% Co, 50% Fe), etc. separated by a Ru layer 1018. Illustrative thicknesses of the first and second pinned layers 1014, 1016 are between about 10 Å and 25 Å. The Ru layer 1018 can be about 5-15 Å, but is preferably selected to provide a saturation field of above about 10 KOe, ideally about 200 Oe. In a preferred embodiment, each of the pinned layers 1014, 1016 is about 18 Å with an Ru layer 1018 therebetween of about 8 Å.

A first spacer layer (SP1-S) 1020 is formed above the pinned layer structure 1012. Illustrative materials for the first spacer layer 1020 include Cu, $CuO_x$, $Cu/CoFeO_x/Cu$ stack, etc. The first spacer layer 1020 can be about 10-30 Å thick, preferably about 20 Å.

A free layer (FL-S) 1022 is formed above the first spacer layer 1020. The magnetic moment of the free layer 1022 is soft and so is susceptible to reorientation from external magnetic forces, such as those exerted by data on disk media. The relative motion of magnetic orientation of the free layer 1022 when affected by data bits on disk media creates variations in the sensing current flowing through the sensor 702, thereby creating the signal. Exemplary materials for the free layer 1022 are CoFe/NiFe stack, etc. An illustrative thickness of the free layer 1022 is about 10-40 Å.

The magnetic orientation of the free layer 1022 must be preset during manufacture, otherwise the orientation will be unstable and could move around at random, resulting in a "scrambled" or noisy signal. This instability is a fundamental property of soft materials, making them susceptible to any external magnetic perturbations. Thus, the magnetic orientation of the free layer 1022 should be stabilized so that when its magnetic orientation moves, it consistently moves around in a systematical manner rather than a random manner. The magnetic orientation of the free layer 1022 should also be stabilized so that it is less susceptible to reorientation, i.e., reversing. The structure disclosed stabilizes the free layer 1022.

A cap (CAP) 1028 can be formed above the free layer 1022. Exemplary materials for the cap 1028 are Ta, Ta/Ru stack, etc. An illustrative thickness of the cap 1028 is 20-30 Å.

While various embodiments have been described above, it should be understood that they have been presented by way of example only, and not limitation. For example, the structures and methodologies presented herein are generic in their application to all MR heads, AMR heads, GMR heads, spin valve heads, etc. Thus, the breadth and scope of a preferred embodiment should not be limited by any of the above-described exemplary embodiments, but should be defined only in accordance with the following claims and their equivalents.

What is claimed is:

1. A magnetic bead, comprising:
    a sensor having a free layer, the free layer having a magnetic moment;
    hard bias layers positioned outside edges of the sensor, the hard bias layers stabilizing the magnetic moment of the free layer;
    each of the hard bias layers having an antiparallel (AP) pinned layer structure positioned above or below the associated hard bias layer, each AP pinned layer structure having at least two pinned layers having magnetic moments that are oriented antiparallel to each other, each AP pinned layer structure stabilizing a magnetic moment of the hard bias layer closest thereto.

2. A head as recited in claim 1, wherein the hard bias layers each include at least Co.

3. A head as recited in claim 2, wherein the hard bias layers are constructed from a material selected from group consisting of CoPt and CoPtCr.

4. A head as recited in claim 1, further comprising stabilizing layers positioned toward the AP pinned layer structures, each stabilizing layer stabilizing a magnetic moment of the pinned layer closest thereto.

5. A head as recited in claim 1, wherein the pinned layers of the AP pinned layer structure each include at least Co, wherein the pinned layers are separated by a layer of Ru.

6. A head as recited in claim 1, wherein the pinned layers of the AP pinned layer structure each include at least Fe, wherein the pinned layers are separated by a layer of Cr.

7. A head as recited in claim 1, further comprising antiferromagnetic layers positioned toward the AP pinned layer structures, each antiferromagnetic layer stabilizing a magnetic moment of the pinned layer closest thereto.

8. A head as recited in claim 7, wherein the antiferromagnetic layers each include at least PtMn.

9. A head as recited in claim 8, wherein the antiferromagnetic layers are constructed from PtMn.

10. A head as recited in claim 8, wherein the antiferromagnetic layers are constructed from PtMnCr.

11. A head as recited in claim 7, wherein the AP pinned layer structures are positioned between the hard bias layers and the antiferromagnetic layers.

12. A head as recited in claim 7, wherein the antiferromagnetic layers each have a thickness of at least about 50 Å measured in a direction perpendicular to a plane of the antiferromagnetic layer, wherein each of the pinned layers of the AP pinned layer structures has a thickness less than about 25 Å.

13. A head as recited in claim 7, wherein the antiferromagnetic layers each have a thickness of at least about 101 Å measured in a direction perpendicular to a plane of the antiferromagnetic layer, wherein each of the pinned layers of the AP pinned layer structures has a thickness less than about 15 Å.

14. A head as recited in claim 7, wherein an Hc of each of the bias layers is at least two times an Hc of hard bias layers in a structure identical to the head of claim 1 but without antiferromagnetic layers.

15. A head as recited in claim 7, wherein an Hc of each of the bias layers is at least three times an Hc of hard bias layers in a structure identical to the head of claim 1 but without antiferromagnetic layers.

16. A head as recited in claim 1, wherein a magnetic moment of each pinned layer closest to the associated hard bias layer is oriented parallel to a magnetic moment of the associated hard bias layer.

17. A head as recited in claim 1, wherein the head forms part of a CIP GMR sensor.

18. A magnetic storage system, comprising:
    magnetic media;
    at least one head for reading from and writing to the magnetic media, each head having:
        a read head portion having the structure recited in claim 1;
        a write head portion;
    a slider for supporting the head; and
    a control unit coupled to the head for controlling operation of the head.

19. A magnetic head, comprising:
    a sensor having a free layer, the free layer having a magnetic moment;
    hard bias structures flanking the sensor, each hard bias structure comprising:
        a hard bias layer, the bias layer stabilizing the magnetic, moment of the free layer;
        an antiparallel (AP) pinned layer structure positioned above or below the hard bias layer, the AP pinned layer structure having at least two pinned layers having magnetic moments that are oriented antiparallel to each other, the AP pinned layer structure stabilizing a magnetic moment of the hard bias layer, and an antiferromagnetic layer positioned above or below the AP pinned layer structure, the antiferromagnetic layer stabilizing a magnetic moment of the pinned layer closest thereto;

wherein an Hc of the bias layer in each of the hard bias structures is at least two times an Hc of hard bias layers in a hard bias structure identical thereto but without antiferromagnetic layer.

20. A magnetic storage system, comprising:

magnetic media;

at least one head fix reading from and writing to the magnetic media, each head having:
- a read head portion having the structure recited in clam 19;
- a write head portion;

a slider for supporting the head; and a control unit coupled to the head for controlling operation of the head.

21. A magnetic head, comprising:

a sensor having a free layer, the free layer having a magnetic moment;

hard bias layers flanking the sensor, the bias layers stabilizing the magnetic moment of the free layer;

two antiparallel (AP) pinned layer structures, one of the AP pinned layer structures being positioned above or below each of the hard bias layers, each AP pinned layer structure having at least two pinned layers having magnetic moments that are oriented antiparallel to each other, each AP pinned layer structure stabilizing a magnetic moment of the hard bias layer closest thereto; and two antiferromagnetic layers, one of the antiferromagnetic layers being positioned above or below each of the AP pinned layer structures for pinning a magnetization of the pinned layer closest thereto.

* * * * *

UNITED STATES PATENT AND TRADEMARK OFFICE
CERTIFICATE OF CORRECTION

PATENT NO. : 7,265,951 B2 Page 1 of 1
APPLICATION NO. : 11/325391
DATED : September 4, 2007
INVENTOR(S) : Gill It is certified that error appears in the above-identified patent and that said Letters Patent is hereby corrected as shown below:

In the claims:
col. 11, line 43 change "magnetic bead" to --magnetic head--;
col. 12, line 24 change "101" to --100--;
col. 13, line 11 change "fix" to --for--;
col. 13, line 14 change "clam" to --claim--.

Signed and Sealed this

Eleventh Day of December, 2007

JON W. DUDAS
*Director of the United States Patent and Trademark Office*